United States Patent
Pabon et al.

(10) Patent No.: US 6,466,513 B1
(45) Date of Patent: Oct. 15, 2002

(54) ACOUSTIC SENSOR ASSEMBLY

(75) Inventors: Miguel F. Pabon, Sugar Land, TX (US); Jean-Pierre Masson, Richmond, TX (US)

(73) Assignee: Schlumberger Technology Corporation, Houston, TX (US)

( * ) Notice: Subject to any disclaimer, the term of this patent is extended or adjusted under 35 U.S.C. 154(b) by 111 days.

(21) Appl. No.: 09/603,785

(22) Filed: Jun. 26, 2000

Related U.S. Application Data

(60) Provisional application No. 60/160,787, filed on Oct. 21, 1999.

(51) Int. Cl.$^7$ ................................................. G01N 1/40
(52) U.S. Cl. ......................................... 367/35; 181/105
(58) Field of Search ........................... 367/35, 34, 150, 367/151, 152–155; 181/105; 250/261

(56) References Cited

U.S. PATENT DOCUMENTS

| | | | |
|---|---|---|---|
| 3,949,352 A | 4/1976 | Vogel | 340/15.5 BH |
| 4,255,798 A | 3/1981 | Havira | 367/35 |
| 4,876,672 A | 10/1989 | Petermann et al. | 367/35 |
| 4,970,695 A | 11/1990 | Huau | 367/13 |
| 5,130,950 A | 7/1992 | Orban et al. | 367/34 |
| 5,212,353 A | 5/1993 | Rambow et al. | 181/106 |
| 5,354,956 A | * 10/1994 | Orban et al. | 181/105 |
| RE34,975 E | * 6/1995 | Orban et al. | 367/34 |
| 5,644,186 A | 7/1997 | Birchak et al. | 310/337 |

FOREIGN PATENT DOCUMENTS

| | | |
|---|---|---|
| WO | WO 00/19242 | 4/2000 |

* cited by examiner

*Primary Examiner*—Edward Lefkowitz
*Assistant Examiner*—Victor J. Taylor
(74) *Attorney, Agent, or Firm*—Victor H. Segura; Brigitte L. Jeffery; John J. Ryberg

(57) ABSTRACT

An ultrasonic sensor assembly for measuring the diameter of a well while it is being drilled is provided. The sensor assembly includes a stack including an inner sound absorbing backing element, a piezoelectric ceramic disk transducer stacked outwardly adjacent the backing element, and a matching layer, preferable made of PEEK and disposed outwardly adjacent the transducer. The layers of the stack are provided within a cavity of a metal cup and are maintained in position by a flexible diaphragm preferably made of PEEK. The diaphragm is sealed with an O-ring. A window, also preferably made of PEEK, is provided against the diaphragm and is held against the diaphragm by a spring. This arrangement acoustically couples the diaphragm to the stack and improves signal recovery. The diaphragm and O-ring form a hydraulic seal between fluid/mud in the well and the stack, and operate to retain the layers of the stack. Also, the diaphragm deforms to permit the stack to move when transmitting or receiving, and maintains an acoustic coupling between the stack and the window.

25 Claims, 2 Drawing Sheets

ACOUSTIC SENSOR ASSEMBLY

CROSS-REFERENCES

This present application claims the benefit of U.S. Provisional Application No. 60/160,787 filed Oct. 21, 1999.

BACKGROUND OF THE INVENTION

1. Field of the Invention

This invention relates broadly to sonic sensors. More particularly, this invention relates to an acoustic sensor used in downhole tools.

2. State of the Art

Knowledge of a diameter of a borehole while it is being drilled is important to the driller because remedial action may be taken by the driller in real time, preventing the delay inherent in tripping the drill string and conducting open-hole logging activities. If, for example, the diameter of the borehole is over-gauge, such a fact may indicate that there is inappropriate mud flow, or an improper mud chemical characteristic, or that the well hydrostatic pressure is too low, or that there is some other source of wellbore instability. If, on the other hand the diameter of the borehole is below gauge or nominal size, such a fact may indicate that the bit is worn and should be replaced so as to obviate the need for later well reaming activities.

Well bore diameter instability increases the risk that the drilling string may become stuck downhole. A stuck drill string implies an expensive and time consuming fishing job to recover the string or deviation of the hole after the loss of the bottom of the drilling string. Well bore diameter variation information is important to the driller in real time so that remedial action may be taken.

Well bore diameter as a function of depth is also important information for a driller where the borehole must be kept open for an extended portion of time. Monitoring of well bore diameters when the drill string is tripped out of the borehole provides information to the driller regarding proper drilling fluid characteristics as they relate to formation properties.

Knowledge of borehole diameter also aids the driller when deviated holes are being drilled. When a borehole is out of gauge, directional drilling is difficult because the drill-string, bottom-hole assembly, and collar stabilizers do not contact the borehole walls as predicted by the driller. Real time knowledge of borehole diameter provides information on which to base directional drilling decisions. Such decisions may eliminate the need for tripping the string so as to modify the bottom-hole assembly to correct a hole curvature deviation problem.

Real time knowledge of well bore diameter is similarly important in logging while drilling (LWD) operations. Certain measurements, especially nuclear measurements of the formation, are sensitive to borehole diameter. Knowledge of the well bore diameter under certain circumstances can be critical for validating or correcting such measurements.

Because real-time knowledge of the borehole diameter is desirable, ultrasonic sensor assemblies for measuring the diameter of a well while it is being drilled are known. For example, U.S. Pat. No. 5,130,950, which is hereby incorporated by reference in its entirety, discloses such a sensor assembly. As seen in prior art FIG. 1 hereof, the prior art sensor assembly 10 is adapted for placement in the wall 12 or stabilizer fin of a drilling collar, which is placed above the drilling bit of a downhole drilling assembly. The ultrasonic sensor assembly 10 includes a sensor stack 14 including an inner sound absorbing backing element 16, a piezoelectric ceramic disk transducer 18 stacked outwardly adjacent the backing element 16, and a matching layer 20 disposed outwardly adjacent the transducer 18 and operating to match the impedance between the ceramic transducer 18 and the environment outside the sensor assembly; i.e., the borehole mud. A window 24, made of PEEK (polyetheretherketone), available from Victrex USA. Inc. of West Chester, Pa., is disposed outwardly of the matching layer 20 of the stack 14, and includes an outwardly facing depression 26 for focusing an ultrasonic pulse into the drilling mud 28 toward the borehole wall 30. An elastomer or epoxy 32 fills the depression to present a smooth face to the flowing mud and the borehole wall.

The backing material 16, the transducer 18, and the matching layer 20 are all held together by glue 22 and provided in a protective rubber jacket 34. The glue 22 prevents the layers of the stack from moving side-to-side relative to each other within the rubber jacket, as the layers must remain in proper alignment for satisfactory performance. An elastomeric material 36 is placed between the rubber jacket 34 and a metallic cup 38 in which the sensor stack 14 is placed. The window 24 is mounted on a spring 40 in the cup 38 outwardly of the rubber jacket 34 and the elastomeric material 36, which surround the sensor stack 14.

The ceramic disk transducer 18 is approximately 0.80 inches in diameter and 0.07 inch in width, and is limited in size by the space required for the rubber jacket 34, which surrounds and seals the sensor stack 14 within the cup 38.

The sensor assembly 10 also includes electrodes 42 attached to the outer and inner surfaces of the ceramic disk transducer 18 and connector pins 44 for connecting the assembly to an electronics module (not shown) disposed within the drilling collar. The electronics module includes control and processing circuitry and stored logic for emitting ultrasonic pulses in the range of approximately 600 KHz to 700 KHz via the ceramic disk transducer 18 and for generating return (also called echo) signals representative of echoes which return to the transducer 18 after bouncing off the borehole wall. The electronic module also preferably includes a source of electrical energy and downhole memory for storing signals as a function of time. It interfaces with an MWD telemetry module for transmitting measurement information to the surface in real time while drilling.

Two sources of noise are present in the vicinity of the sensor stack of the tool. The first can be characterized as drilling noise, which is of a lower frequency band than that of the acoustic pulse-echo of the transducer. The second is pumping noise, which is characterized by a frequency band, which extends into the frequency range of the pulse-echo apparatus.

Pumping noise is mechanically filtered not only by the rubber jacket 34 surrounding the sensor stack 14, but also by a filter ring 46 mounted radially outwardly of the transducer 18 about the rubber jacket. The backing element 20 is shock protected by rubber packing between it and the elastomeric material, which envelops the stack.

Drilling noise, which may be of extremely high amplitude, is partially mechanically filtered by the rubber jacket 34 and filter ring 46 described above and partially electronically filtered. Electronic filtering is achieved by an electronic high-pass filter placed prior to signal amplification to avoid amplifier saturation, which could mask ultrasonic signal detection during amplifier saturation and recovery time.

Even in view of the above, it has been found that the assembly of the ultrasonic sensor system of the U.S. Pat. No.

5,130,950 is not particularly effective in signal transmission and recovery. One reason for this is that the glue between each of the layers of the stack imparts undesirable attenuation to the recovered signal. Another reason is that there is insufficient signal output from the sensor disk, which is limited in size by the rubber boot. In addition, the prior art sensor system is difficult to manufacture, and requires a relatively large amount of time to manufacture as the glue and the elastomeric material must cure between manufacturing steps. Moreover, there is inconsistency between the performance of different sensor systems due to different amount of glue that is manually placed between the layers of the stack.

SUMMARY OF THE INVENTION

It is therefore an object of the invention to provide an ultrasonic sensor capable of determining the tool standoff from the borehole wall, and hence the well diameter section at a given depth.

It is another object of the invention to provide an ultrasonic sensor assembly that is optimized for signal recovery.

It is also object of the invention to provide an ultrasonic sensor assembly which positions a sonic sensor relatively closer to the formation, and which enables the use of a relatively larger backing volume.

It is a further object of the invention to provide an ultrasonic sensor that does not utilize glue between the layers of the stack.

It is an additional object of the invention to provide an ultrasonic sensor that is adapted for operation under high pressures.

It is yet another object of the invention to provide an ultrasonic sensor that can be easily manufactured to consistent specifications.

It is yet a further object of the invention to provide an ultrasonic sensor that is relatively inexpensive to manufacture.

In accord with these objects, which will be discussed in detail below, an ultrasonic sensor assembly for measuring the diameter of a well while it is being drilled is provided. The sensor assembly includes a sensor stack including an inner sound absorbing backing element, a piezoelectric ceramic disk sensor stacked outwardly adjacent the backing element, and a matching layer, preferably made of PEEK and disposed outwardly adjacent the ceramic disk. The layers of the stack are provided within a cavity of a metal cup, without a surrounding rubber boot, and are maintained in position by a flexible diaphragm preferably made of PEEK. The diaphragm is sealed with an O-ring. A window, also preferably made of PEEK, is provided against the diaphragm and is held against the diaphragm by a spring.

The diaphragm and O-ring of the invention form a hydraulic seal between fluid/mud in the well and the sensor stack, and operate to retain the layers of the sensor stack. In addition, the diaphragm is acoustically coupled to the sensor stack, thereby improving signal recovery relative to prior art ultrasonic sensor assemblies that utilize glue to hold the layers of the stack together. In addition, the diaphragm deforms to permit the sensor stack to move when transmitting or receiving, yet is adapted to maintain an acoustic coupling between the sensor stack and the window. Furthermore, the diaphragm permits pressure, temperature and volume compensation of the sensor stack. That is, since the sensor stack is comprised of materials of the different thermal properties, it is expected that the stack will experience some volumetric shrinking due to pressure in conjunction with some volumetric expansion due to temperature effects. The diaphragm accommodates to the changes while maintaining perfect acoustic coupling of all elements.

Additional objects and advantages of the invention will become apparent to those skilled in the art upon reference to the detailed description taken in conjunction with the provided figures.

BRIEF DESCRIPTION OF THE DRAWINGS

Prior art

DETAILED DESCRIPTION OF SPECIFIC EMBODIMENTS

Figure 1:
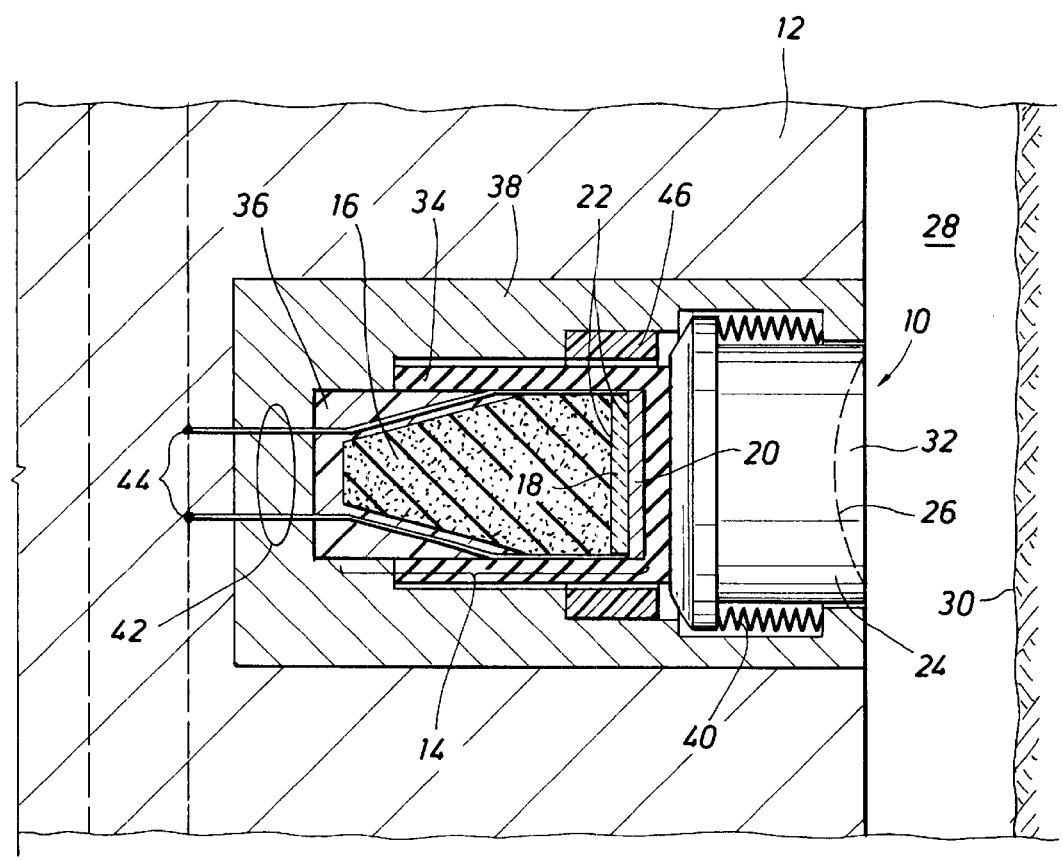
FIG. 1 is a longitudinal section view of an ultrasonic sensor assembly of the prior art.
Figure 2:
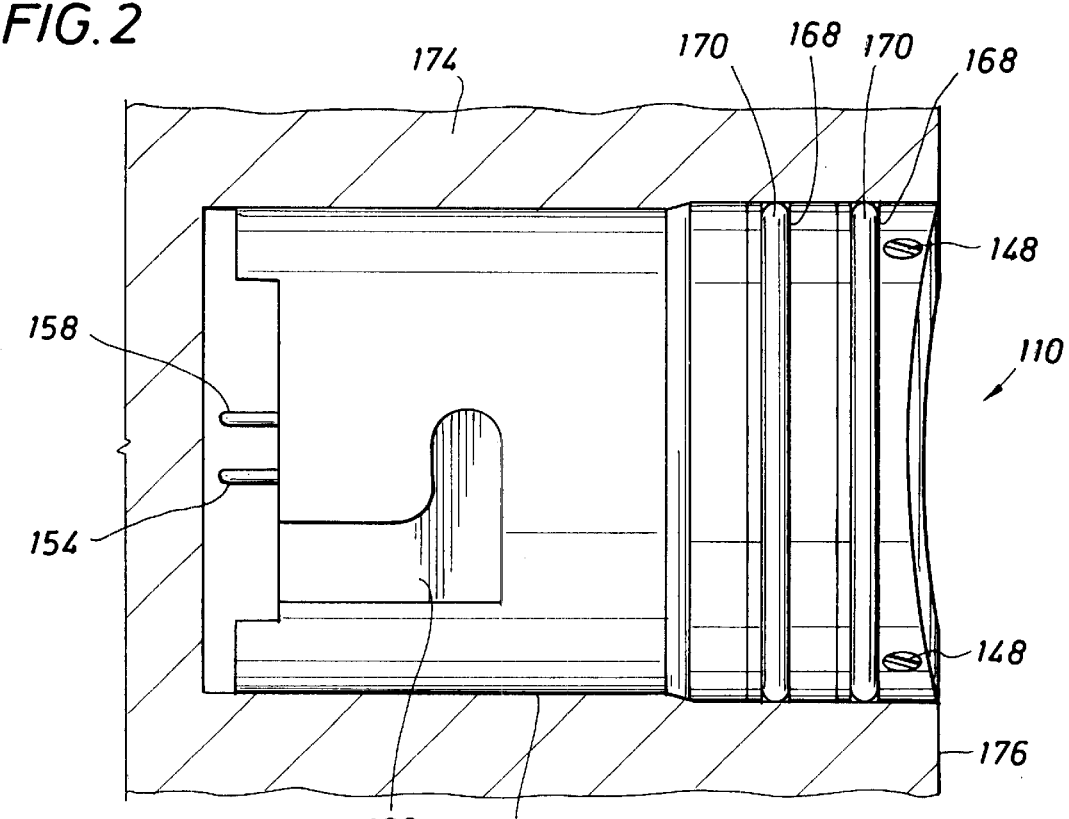
FIG. 2 is a side elevation of an ultrasonic sensor assembly according to the present invention.
Figure 3:
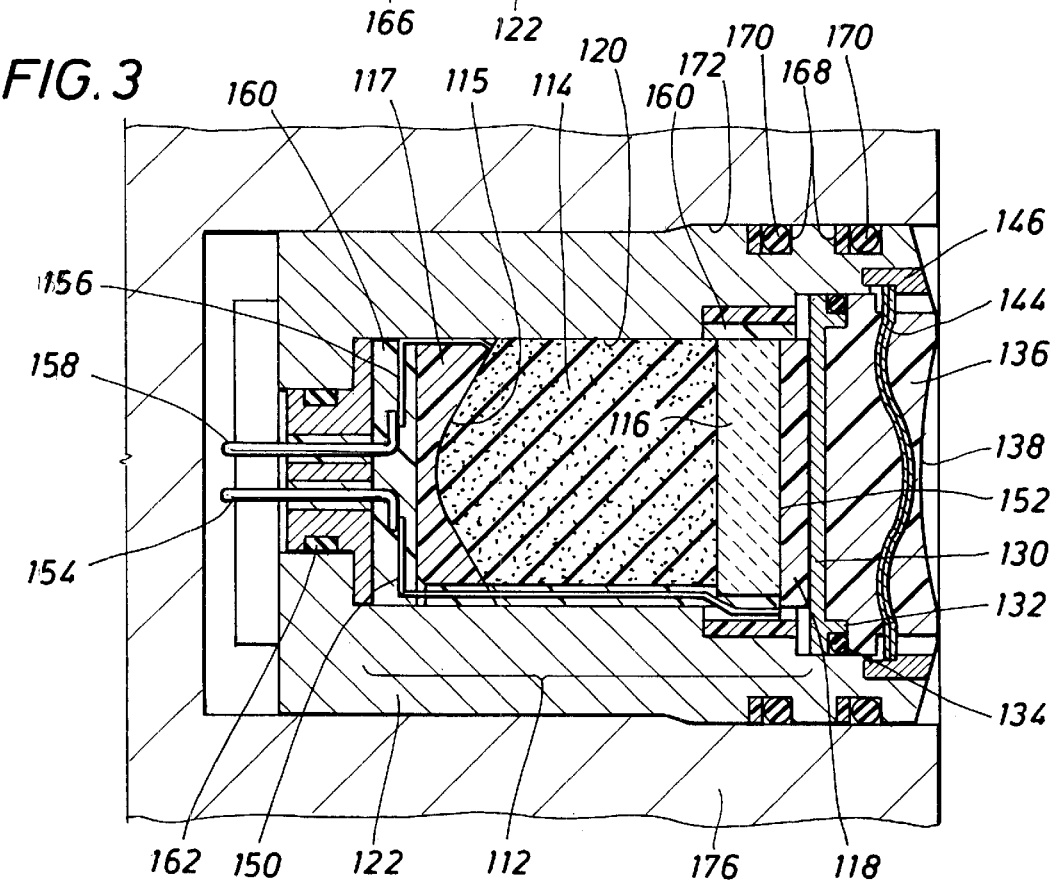
FIG. 3 is a longitudinal section view of the ultrasonic sensor assembly of FIG. 2.

Turning now to FIGS. 2 and 3, an ultrasonic sensor assembly 110 for measuring the diameter of a well while it is being drilled is provided. The sensor assembly 110 includes a sensor stack 112 including an inner sound absorbing backing element 114, a transducer 116 stacked outwardly adjacent the backing element, and an impedance matching layer 118 which is disposed outwardly adjacent the ceramic disk. The backing element 114 is preferably made from a conductive material such as rubber with tungsten particles, and preferably has a convex rear portion 115. A support 117, preferably made from polyetheretherketone (PEEK), is provided to the rear portion 115 to provide the backing element with a cylindrical form. The transducer 116 is made from a piezoelectric ceramic disk. The matching layer 118 is preferably made from PEEK. The layers of the stack 112 are each preferably approximately one inch in diameter, and the transducer 16 is preferably 0.25 inch thick. The sensor stack 112 is provided within a stepped cavity 120 of a metal cup-like housing 122.

A relatively flexible diaphragm 130, preferably made of PEEK, is situated outwardly of and against the matching layer 118. The diaphragm is preferably approximately 1.125 inches in diameter and approximately 0.04 inch thick. The diaphragm 130 includes a lip 132. An O-ring 134 is positioned circumferentially around the lip 132 of the diaphragm 130 and in contact with the stepped cavity 120 to provide a fluid-tight seal for the stack 112. A window 136, also preferably made of PEEK, is held against the outside of the diaphragm 130. The window 136 includes an outer concavity 138, with preferably an approximately two-inch radius, which operates to focus an ultrasonic pulse from the transducer 116 into drilling mud toward a borehole wall and further operates to focus a recovered signal back to the sensor disk. Contrary to the prior art, no epoxy or elastomer is provided in the concavity. The window 136 is forced against the diaphragm 130 by a spring 144 which is maintained in position by a ring 146 secured by screws 148 (FIG. 2) extending through the housing 122 and into the ring. As such, the transducer 116, the matching layer 118, the diaphragm 130, and the window 136 are directly acoustically coupled, and according to the preferred embodiment of the invention, are optimized for ultrasonic signal transmission and recovery while reducing or eliminating sensor reverberation.

A first electrode 150, preferably made from a thin copper foil, is attached at one end to the outer surface 152 of the transducer 116 and at the other end to a connector pin 154 for connecting the assembly to an electronics module (not shown) disposed within a drilling collar (not shown). A second electrode 156 is attached at one end to the backing element 114, which functions as an electrode due to its conductivity, and at the other end to another connector pin 158. As discussed in detail in previously incorporated U.S. Pat. No. 5,130,950, the electronics module includes control and processing circuitry and stored logic for emitting ultrasonic pulses via the transducer 116 and for generating echo signals representative of echoes of such pulses that return to the transducer. The electronic module also preferably includes a source of electrical energy and downhole memory for storing signals as a function of time. It interfaces with a MWD telemetry module for transmitting measurement information to the surface in real time while drilling.

All interstices of the cavity 120 of the housing 122 surrounding the sensor stack 112, the electrodes 150, 156, and a portion of the connector pins 154, 158 is filled with a vacuum gel 160 such as "SYGARD 182" available from Dow Corning Corp. A grommet 162 seals the gel within the cavity, and the connector pins 154, 158 extend through the grommet 162. The gel prevents the stack form collapsing under hydrostatic pressure when the sensor assembly 110 is in use downhole. Likewise, hydrostatic pressure keeps the layers of the stack in contact with each other and eliminates the need for glues, as used in the prior art.

The exterior of the casing 122 includes a bayonet mount 166 and a plurality of circumferential channels 168 and O-rings 170 within the channels, which lock and seal the assembly within a radial bore 172 of a wall 174 of a drilling collar 176.

It should be appreciated by those skilled in the art that the diaphragm 130 and O-ring 134 form a hydraulic seal between fluid/mud in the well and the sensor stack 112, and further operate to retain the layers of the sensor stack in position. Also, the diaphragm deforms to permit the sensor stack to move (i.e., vibrate) when transmitting or receiving. Likewise, the diaphragm provides pressure, temperature and, volume compensation for the sensor stack. Moreover, the hydrostatic pressure on the diaphragm maintains a constant acoustic coupling between the sensor stack and the window.

In addition, the arrangement of the matching layer 118, diaphragm 130, and window 136 provides an acoustic coupling between the diaphragm 130 and the sensor stack 112 which provides enhanced signal transmission and recovery relative to prior art ultrasonic sensor assemblies which utilize glue to hold the layers of the stack together and a rubber jacket to separate the stack from the window. The elimination of glue eliminates the inconsistency in performance among sensors provided with different amounts of glue between the layers of the stack.

Moreover, the elimination of the rubber boot used in the prior art permits the transducer 116 to be located closer to the formation. In turn, this provides more room within the cavity of the casing thereby permitting a relatively larger transducer capable of producing a lower frequency (e.g., in the range of 200 KHz to 300 KHz) and therefore increased performance relative to the prior art assembly. Sound attenuation in mud is larger when working with higher frequencies, this working at a lower spectrum yields stronger signals for the same reflecting geometry. In addition, a larger amount of backing material 114, which absorbs undesirable rearward traveling sound waves, may be located in the cavity. In addition, the diameter and thickness of the transducer are adapted to reduce or eliminate radial modes. That is, the acoustic signal generated by a ceramic disk presents larger undesirable radial mode waves as the ratio of diameter over thickness gets smaller. Thus, the relatively increased diameter of the transducer 116 in the invention significantly decreases the radial mode response.

There have been described and illustrated herein an embodiment of a ultrasonic sensor for use in downhole applications. While particular embodiments of the invention have been described, it is not intended that the invention be limited thereto, as it is intended that the invention be as broad in scope as the art will allow and that the specification be read likewise. Thus, while particular materials have been disclosed, it will be appreciated that other materials can be used as well. For example, while PEEK is a preferred plastic material for several elements, it will be appreciated that another plastic which when subject to relatively high temperatures does not deform and which has appropriate impedance matching characteristics may also be used. In addition, while particular preferred dimensions have been disclosed, it will be understood that other dimensions can be provided to the elements. Likewise, while a preferred frequency range for the sensor has been disclosed, it will be appreciated that other frequencies could be utilized. Also, while a preferred structure for mounting the sensor assembly in a drilling collar is provided, it will be recognized that other mounting structures may be used. Similarly, while a preferred particular arrangement has been disclosed for locating the O-ring around the diaphragm, it will be appreciated that other arrangements could be utilized. For example, instead of a lip, the diaphragm could be designed with a circumferential groove in which the O-ring is located, provided account is taken for the release of air (e.g., by assembling the sensor in a vacuum), which might otherwise be trapped behind the diaphragm during assembly. It will therefore be appreciated by those skilled in the art that yet other modifications could be made to the provided invention within the scope of the attached claims.

What is claimed is:

1. A sensor assembly for use in a borehole application, comprising:
   a) a housing having a cavity;
   b) a stack provided in said cavity, said stack including a sound absorbing backing material, an ultrasonic transducer, and an impedance matching material to match an impedance of said transducer to an impedance of fluid in the borehole;
   c) a diaphragm positioned at one end of the stack abutting against said stack and in contact with said cavity; and
   d) a window biased by a spring against said diaphragm.

2. A sensor assembly according to claim 1, further comprising:
   e) a pair of electrodes conductively coupled to said transducer.

3. A sensor assembly according to claim 2, wherein said backing material includes conductive particles, and one of said pair of electrodes is coupled to said backing material and said backing material is conductively coupled to said transducer.

4. A sensor assembly according to claim 1, further comprising:
   e) a gel within said cavity surrounding said stack.

5. A sensor assembly according to claim 1, wherein said matching material, said diaphragm and said window are made of PEEK.

6. A sensor assembly according to claim 1, wherein said transducer is a piezoelectric ceramic disk.

7. A sensor assembly according to claim 1, wherein said diaphragm forms a hydrostatic seal of said cavity.

8. A sensor assembly according to claim 7, wherein said stack further includes an O-ring, and said diaphragm is held within said housing by an O-ring.

9. A sensor assembly according to claim 8, wherein said diaphragm includes a perpendicular lip inwardly adjacent an edge of said diaphragm, and said O-ring sits around said lip at said edge of said diaphragm.

10. A sensor assembly according to claim 1, wherein said window is formed with an exterior concavity.

11. A sensor assembly according to claim 1, wherein said transducer has a diameter of at least approximately one inch.

12. A sensor assembly according to claim 1, wherein said sound absorbing backing material, said ultrasonic transducer, and said impedance matching material are stacked in direct contact with one another without glue layers.

13. A sensor assembly according to claim 1, wherein said backing material has a convex rear end furthest said ultrasonic transducer.

14. A sensor assembly according to claim 13, wherein said stack further includes a concave cup provided on said convex end of said backing material such that said backing material and said cup together have a substantially cylindrical shape.

15. A sensor assembly according to claim 14, wherein said cup is made of PEEK.

16. A sensor assembly according to claim 1, wherein said ultrasonic transducer produces an ultrasonic signal in the range of 200 KHz to 300 KHz.

17. A drilling collar for use in a borehole drilling assembly for drilling a borehole, said drilling collar comprising:
   a) a cylindrical collar having a wall provided with a radial bore; and
   b) a sensor assembly within said radial bore, including
      i) housing having a cavity,
      ii) a stack provided in said cavity, said stack including a sound absorbing backing material, an ultrasonic transducer, and an impedance matching material to match an impedance of said transducer to an impedance of fluid in the borehole,
      iii) a diaphragm positioned at one end of the stack abutting against the stack and in contact with said cavity, and
      iv) a window biased by a spring against said diaphragm.

18. A sensor assembly according to claim 17, wherein said transducer is a piezoelectric ceramic disk.

19. A sensor assembly according to claim 17, wherein said matching material, said diaphragm and said window are made of PEEK.

20. A sensor assembly according to claim 17, wherein said diaphragm forms a hydrostatic seal of said cavity.

21. A sensor assembly according to claim 17, wherein said stack further includes an O-ring, and said diaphragm is held within said housing by said O-ring.

22. A sensor assembly according to claim 21, wherein said diaphragm includes a perpendicular lip inwardly adjacent an edge of said diaphragm, and said O-ring sits around said lip at said edge of said diaphragm.

23. A sensor assembly according to claim 17, wherein said transducer has a diameter of at least approximately one inch and generates an ultrasonic frequency in the range of 200 KHz to 300 KHz.

24. A sensor assembly according to claim 17, wherein said sound absorbing backing material, said ultrasonic transducer, and said impedance matching material are stacked in direct contact with one another without glue layers.

25. A sensor assembly according to claim 17, wherein said backing material has a convex rear end furthest said ultrasonic transducer, and said stack further includes a concave cup provided on said convex end of said backing material such that said backing material and said cup together have a substantially cylindrical shape.

\* \* \* \* \*